US012561727B2

(12) United States Patent
Brown

(10) Patent No.: US 12,561,727 B2
(45) Date of Patent: \*Feb. 24, 2026

(54) CONTENT STORAGE MANAGEMENT

(71) Applicant: Comcast Cable Communications, LLC, Philadelphia, PA (US)

(72) Inventor: Tom Brown, West Chester, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,027

(22) Filed: May 6, 2024

(65) Prior Publication Data

US 2024/0303717 A1 Sep. 12, 2024

Related U.S. Application Data

(63) Continuation of application No. 13/753,301, filed on Jan. 29, 2013, now Pat. No. 12,014,410, which is a continuation-in-part of application No. 12/510,733, filed on Jul. 28, 2009, now Pat. No. 11,144,969.

(51) Int. Cl.
| | |
|---|---|
| *H04N 21/24* | (2011.01) |
| *G06F 16/435* | (2019.01) |
| *G06F 16/438* | (2019.01) |
| *G06F 16/48* | (2019.01) |
(Continued)

(52) U.S. Cl.
CPC ....... *G06Q 30/0631* (2013.01); *G06F 16/435* (2019.01); *G06F 16/4387* (2019.01); *G06F 16/489* (2019.01); *G06Q 30/0277* (2013.01)

(58) Field of Classification Search
None
See application file for complete search history.

(56) References Cited

U.S. PATENT DOCUMENTS

| | | | |
|---|---|---|---|
| 6,189,008 B1 | 2/2001 | Easty et al. | |
| 6,425,057 B1 | 7/2002 | Cherkasova et al. | |
| 6,505,169 B1 | 1/2003 | Bhagavath et al. | |
(Continued)

FOREIGN PATENT DOCUMENTS

| | | | | |
|---|---|---|---|---|
| CN | 100518088 C | * | 7/2009 | ......... H04L 67/1095 |
| EP | 2063598 A1 | | 5/2009 | |

OTHER PUBLICATIONS

Songqing Chen et al., "Sproxy: A Caching Infrastructure to Support Internet Streaming," IEEE Transaction on Multimedia, vol. 9, No. 5, Aug. 1, 2007, pp. 1062-1072.
(Continued)

*Primary Examiner* — Dipen M Patel
(74) *Attorney, Agent, or Firm* — Banner & Witcoff, Ltd.

(57) ABSTRACT

Methods and systems for providing content and content recommendations are described. Content recommendations for users in a service area may be based on content requests from users within the same service area. Content recommendations over a period of time may dynamically change based on many factors, including: the number of requests for particular content within one or more time frames, the storage location of requested content relative to requesting users, and whether a request occurs within a time period of rapid shift in use and types of content requested. A content recommendation including one or more content recommendations may be provided to users.

32 Claims, 7 Drawing Sheets

(51) Int. Cl.
  *G06Q 30/0241* (2023.01)
  *G06Q 30/0601* (2023.01)

(56) References Cited

U.S. PATENT DOCUMENTS

| | | | |
|---|---|---|---|
| 6,564,380 | B1 | 5/2003 | Murphy |
| 6,571,279 | B1 | 5/2003 | Herz et al. |
| 6,651,141 | B2 | 11/2003 | Adrangi |
| 6,757,277 | B1 | 6/2004 | Shaffer et al. |
| 6,853,982 | B2 | 2/2005 | Smith et al. |
| 7,260,684 | B2 | 8/2007 | Mendelson et al. |
| 7,299,275 | B2 | 11/2007 | Tsukidate et al. |
| 7,787,818 | B2 | 8/2010 | Shapiro et al. |
| 7,831,989 | B1 * | 11/2010 | Calzone ............. H04N 21/6118 |
| | | | 370/428 |
| 7,912,458 | B2 | 3/2011 | Ramer et al. |
| 7,991,841 | B2 | 8/2011 | Anderson et al. |
| 8,050,675 | B2 | 11/2011 | Ramer et al. |
| 8,060,398 | B2 | 11/2011 | Canning et al. |
| 8,073,741 | B2 | 12/2011 | Blumenthal et al. |
| 8,255,457 | B2 | 8/2012 | Turner et al. |
| 8,806,531 | B1 | 8/2014 | Ho et al. |
| 8,863,204 | B2 | 10/2014 | Whyte et al. |
| 8,892,591 | B1 | 11/2014 | Haugen et al. |
| 9,215,423 | B2 | 12/2015 | Kimble et al. |
| 2002/0078174 | A1 * | 6/2002 | Sim .................... H04L 67/1095 |
| | | | 709/252 |
| 2002/0156783 | A1 | 10/2002 | Schwartz et al. |
| 2003/0005457 | A1 | 1/2003 | Faibish et al. |
| 2003/0099237 | A1 * | 5/2003 | Mitra ...................... H04L 45/44 |
| | | | 370/393 |
| 2003/0130862 | A1 | 7/2003 | Stern et al. |
| 2004/0010588 | A1 | 1/2004 | Slater et al. |
| 2004/0064832 | A1 | 4/2004 | Tsukidate et al. |
| 2004/0103437 | A1 | 5/2004 | Allegrezza et al. |
| 2004/0254851 | A1 | 12/2004 | Himeno et al. |
| 2005/0117853 | A1 | 6/2005 | Murali et al. |
| 2005/0149500 | A1 | 7/2005 | Marmaros et al. |
| 2005/0262245 | A1 | 11/2005 | Menon et al. |
| 2006/0206912 | A1 | 9/2006 | Klarfeld et al. |
| 2006/0271972 | A1 | 11/2006 | Pai et al. |
| 2008/0201225 | A1 | 8/2008 | Maharajh et al. |
| 2008/0228821 | A1 | 9/2008 | Mick et al. |
| 2008/0270579 | A1 | 10/2008 | Herz et al. |
| 2009/0083279 | A1 | 3/2009 | Hasek |
| 2009/0163183 | A1 | 6/2009 | O'Donoghue et al. |
| 2009/0168795 | A1 | 7/2009 | Segel |
| 2010/0121940 | A1 | 5/2010 | Reeser |
| 2010/0146038 | A1 | 6/2010 | Hajiaghayi et al. |
| 2010/0192175 | A1 | 7/2010 | Bachet et al. |
| 2010/0250772 | A1 | 9/2010 | Mao |
| 2010/0251313 | A1 * | 9/2010 | Mao ................... H04N 21/2312 |
| | | | 725/98 |
| 2010/0281509 | A1 | 11/2010 | Yu et al. |
| 2011/0035441 | A1 | 2/2011 | Osuga |
| 2011/0061077 | A1 | 3/2011 | Georgis et al. |
| 2011/0131341 | A1 | 6/2011 | Yoo et al. |
| 2011/0191802 | A1 | 8/2011 | Haberman et al. |
| 2011/0241882 | A1 | 10/2011 | Gonzales et al. |
| 2011/0275353 | A1 | 11/2011 | Liu |
| 2011/0282888 | A1 | 11/2011 | Koperski et al. |
| 2011/0289139 | A1 | 11/2011 | McIntosh et al. |
| 2011/0289533 | A1 | 11/2011 | White et al. |
| 2011/0307478 | A1 | 12/2011 | Pinckney et al. |
| 2012/0159558 | A1 | 6/2012 | Whyte et al. |
| 2013/0144750 | A1 | 6/2013 | Brown |
| 2014/0149533 | A1 | 5/2014 | Bergman et al. |

OTHER PUBLICATIONS

Agarwal, "Intelligent content caching for mobile devices," Deutsche Telekom AG, Laboratories, May 2006, pp. 1-4.
Canali et al., "Content Delivery and Management," 2008, pp. 1-22.
Pathan, "Utility-Oriented Internetworking of Content Delivery Networks," Department of Computer Science and Software Engineering, the University of Melbourne, Australia, Nov. 2009, pp. 1-203.
Qasim et al., "A Partial-Order Based Active Cache for Recommender Systems," 2009, pp. 1-4.
European Office Action—EP 10170130.8—Dated Sep. 8, 2015.
Response to EP Office Action—EP App 10170130.8—Filed Jan. 18, 2016.
Canadian Office Action—CA Appl. 2,710,121—dated Jun. 15, 2016.
May 10, 2017—Canadian Office Action—CA 2,710, 121.
Apr. 17, 2018—Canadian Office Action—CA 2,710,121.
May 24, 2018—European Decision to Refuse—EP 10170130.8.
Apr. 2, 2019—Canadian Office Action—CA 2,710,121.
Mar. 13, 2020—Canadian Office Action—CA 2,710,121.
Jan. 4, 2021—Canadian Office Action—CA 2,710,121.
Nov. 1, 2021—Canadian Office Action—CA 2,710,121.
Sep. 16, 2022—CA Office Action—CA App. No. 2,710,121.
Sydney Roy (Whalen), Why Is a CDN Critical for Live Streaming?, Apr. 3, 2023, https://www.wowza.com/blog/cdn-live-streaming.
Cisco, Cisco on Cisco Best Practices Streaming Video for High-Impact Business Communications, 1992-2008, Cisco Systems Inc., 1992-2008, https://www.cisco.com/c/dam/en_us/about/ciscoitatwork/downloads/ciscoitatwork/pdf/cisco_streaming_white_paper.pdf.
Cisco, The Cisco Content Delivery Network Solution for the Enterprise, 2000, Cisco Systems Inc., https://www.cisco.com/c/dam/global/tr_tr/assets/docs/Enterprise.pdf.
IXIA, Testing Multiplay Networks, Apr. 2008, https://support.ixiacom.com/sites/default/files/resources/whitepaper/multiplay_white_paper.pdf.

* cited by examiner

600

605

610

615

| Content Item | Last 15 minutes | Last 1 Hour | Last 3 Hours | Current Hour |
|---|---|---|---|---|
| Movie 1 | 1 | 6 | 8 | 3 |
| TV Show 1 | 3 | 3 | 3 | 2 |
| TV Show 2 | 2 | 3 | 6 | 5 |
| Song 1 | 1 | 1 | 3 | 1 |
| Digital Book 1 | 4 | 5 | 6 | 4 |

CONTENT STORAGE MANAGEMENT

CROSS-REFERENCE TO RELATED APPLICATIONS

This application is a continuation of and claims priority to U.S. patent application Ser. No. 13/753,301, filed Jan. 29, 2013, which is a continuation-in-part of U.S. patent application Ser. No. 12/510,733, filed Jul. 28, 2009 (now U.S. Pat. No. 11,144,969), each of which is hereby incorporated by reference in its entirety.

BACKGROUND

The selection of movies, television shows, games, music, and other content available to users is ever growing. Costs associated with providing content to users may increase as more network bandwidth and infrastructure is required to fulfill content requests. This may especially be true for individual users that request personalized content. A system for more efficiently and more cost-effectively providing content to users is needed.

SUMMARY

Some of the various features described herein relate to a system and method for providing content recommendations. In some aspects, a method may include capturing, for each of a plurality of content items, information related to (e.g., that identifies) a number of times the content item was requested during a predetermined time period and the geographic area from which it was requested. The method may include creating a content recommendation, such as a content recommendation list, for users in a first geographic area. The content recommendation may identify one or more content items selected from the plurality of content items, and each content item in the recommendation list may be prioritized according to weighting criteria. One weighting criterion may relate to a time elapsed from when a request for the content item was made. The content recommendation list may be transmitted to at least one device (e.g., a user device) within the first geographic area. In some aspects, transmitting the content recommendation list may be responsive to a content item recommendation request. The content item may include data, applications, audio and/or video content.

Requests for content items, such as items in a recommendation list, may occur within one of a first time frame and a second time frame having a start time earlier than the first time frame. Content items in the content recommendation list may be grouped according to the first time frame and the second time frame. The content items may be sorted within each group according to a number of requests, for example, from users in the first geographic area each content item has received within the corresponding time frame. The method may also include calculating a score for a first content item based on the number of requests from users in the first geographic area for the first content item within the first time frame and the number of requests from users in the first geographic area for the first content item within the second time frame, and one or more weights assigned to counts in the first time frame and to counts in the second time frame. The method may also include identifying (such as placing an identification of) the first content item in the content recommendation list based on the score. Identifying content may include placing or associating an identification with the item and, for example, placing the content item at a beginning of the list when the score is greater than other scores calculated for other content items identified by the content recommendation list.

In some aspects, a method described herein may include capturing, for each of a plurality of content items maintained at one or more of a plurality of network locations a first one or more counts indicating how many requests have been received for the respective content item from devices (e.g., client devices) within a first period of time. For each content item, the network location of the content item may be determined, and a popularity score based on the first one or more counts and the network location of the content item may be determined. The network location may include at least one of an edge cache, a gateway server, and a master library, and the edge cache may be configured to transmit content to client devices within a service area of a content delivery network. A content recommendation list that identifies one or more content items of the plurality of content items may be created, and the arrangement of the content recommendation list may be based on the popularity scores.

The method may also include increasing the score of a content item based on a determination that the content item is stored at a favorable network location, such as the edge cache, and decreasing the score of a content item based on a determination that the content item is stored at a less favorable location (e.g., geographic location), such as a remote server or a master library.

In some aspects, the method may include capturing, for each content item, a second one or more counts indicating how many requests have been received for the respective content item within a second period of time.

Furthermore, determining the popularity score for each content item may include determining a first weight corresponding to the first period of time and a second weight corresponding to the second period of time and determining that a request for a content item occurs within a predetermined time period. The predetermined time period may indicate a period of rapid change of content requests. In response to determining that the request occurs within the predetermined time period, the first and second weights may be adjusted, and the popularity scores may be determined based on the adjusted first and second weights. In some aspects, the second period of time may comprise the first period of time, and adjusting the first and second weights may include increasing the first weight and decreasing the second weight.

The method may also include, for a content item of the plurality of content items, determining whether the content item is stored at an edge cache connected to a service area of a content delivery network. If the popularity score of the content item exceeds a predetermined threshold and the content item is not stored at the edge cache, the content item may be stored at the edge cache. Furthermore, the method may include determining whether a content item is stored at an edge cache proximate to a service area of a content delivery network. If the content item is positioned above a predetermined position on the content recommendation list and the content item is not stored at the edge cache, the content item may be stored at the edge cache (e.g., moved to the edge cache).

In some aspects, a method may include identifying or defining a service area of a network, such as a content delivery network. The service area may include an edge cache configured to transmit cached content to devices within the service area. A number of requests received for each of a plurality of content items occurring within a first time frame and a second time frame may be identified. For each content item, a popularity score based on the number of requests for the content item in the first time frame and the number of requests for the content item in the second time frame may be determined. A content recommendation, such as a content recommendation list, that identifies one or more content items selected from the plurality of content items having a popularity score greater than a predetermined popularity score threshold may be generated. The content recommendation list may be transmitted to a client device within the service area. Transmitting the content recommendation list to at least one of the client devices within the service area may be responsive to a request for the content recommendation list.

The method may include determining a first weight or factor corresponding to the first time frame and a second weight corresponding to the second time frame, the second weight different from the first weight. Determining the popularity score for each content item may include determining (e.g., calculating) the popularity score based on the first and second weights and the number of requests for the content item in the first and second time frames. The method may include determining that a request for the content recommendation list occurs within a predetermined time period, wherein the predetermined time period may indicate a period of rapid change of content requests. In response to determining that the request occurs within the predetermined time period, the first and second weights or factors may be adjusted, and the popularity score for each content item may be determined using the adjusted first and second weights and the number of requests for the content item in the first and second time frames. The second time frame may include the first time frame, and adjusting the first and second weights may include increasing the first weight and decreasing the second weight. Alternatively, the first time frame may be more recent than the second time frame, and adjusting the first and second weights may include increasing the first weight and decreasing the second weight.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
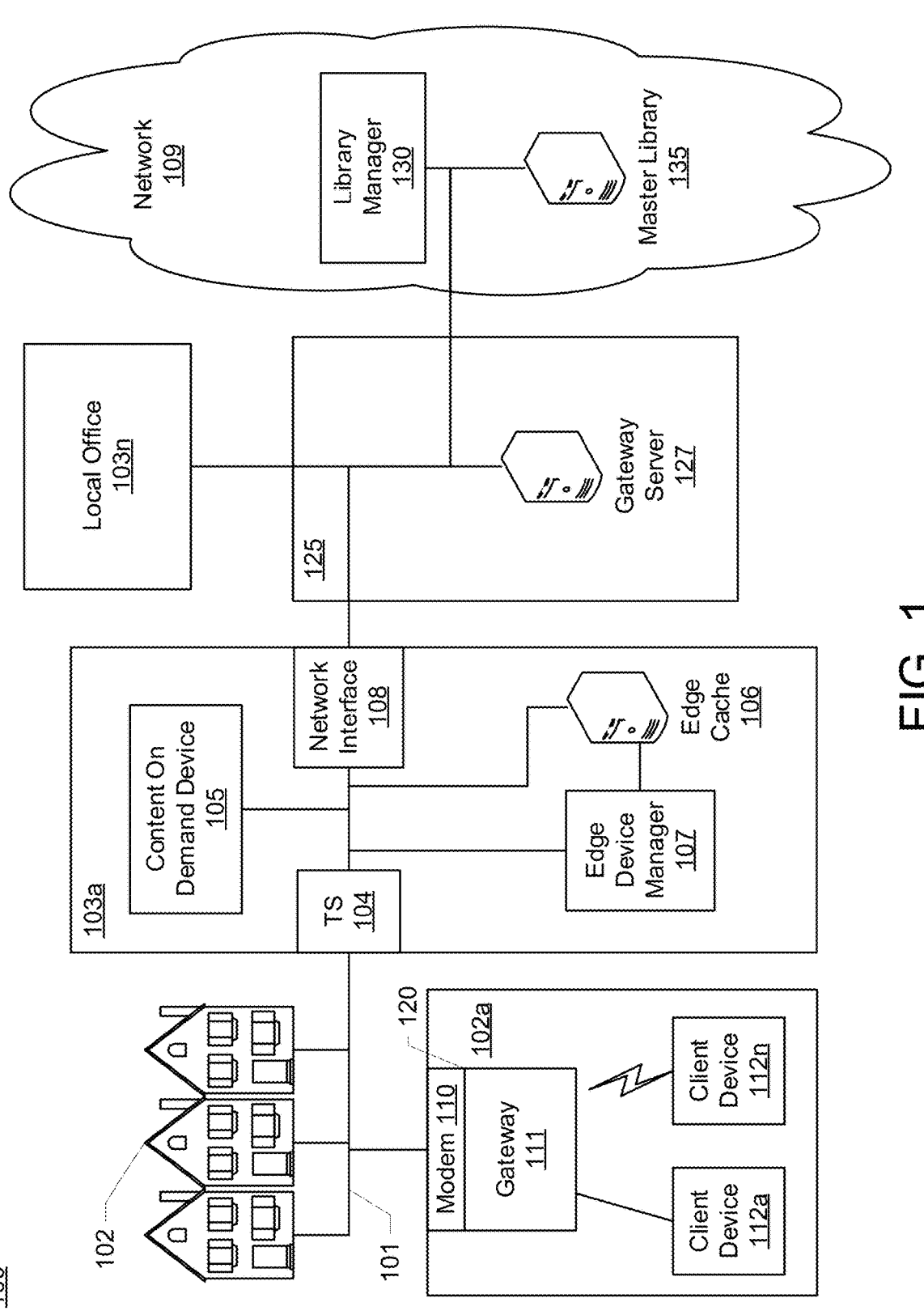
FIG. 1 illustrates an example information access and distribution network.

FIG. 1 illustrates an example information access and distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as homes 102, to a local office (e.g., a central office or headend 103a). The local office 103a may transmit downstream information signals onto the links 101, and each home 102 may have a receiver used to receive and process those signals.

There may be one link 101 originating from the local office 103a, and it may be split a number of times to distribute the signal to various homes 102 in the vicinity (which may be many miles) of the local office 103a. These homes 102 may be in the same service area, such as a service area of the local office 103a. Homes 102 in the same service area may be geographically located within the same region (s). These Homes 102 may also be physically and/or directly connected to the same network utilized by the local office 103a to provide content (e.g., an interconnection of links 101). Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103a may include an interface 104, which may be a termination system (TS), such as a cable modem termination system (CMTS), which may be a computing device configured to manage communications between devices on the network of links 101 and backend devices such as a content on demand device 105, edge cache 106, and edge device manager 107 (to be discussed further below). The interface may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface may be configured to place data on one or more downstream channels or frequencies to be received by devices, such as modems at the various homes 102, and to receive upstream communications from those modems on one or more upstream frequencies.

The local office 103a may also include one or more network interfaces 108, which can permit the local office 103a to communicate with various other local offices 103n, devices 125, and/or networks 109. The interface 108 may include corresponding circuitry needed to communicate with other local offices, devices, and/or networks. For example, interface 108 may facilitate communications with other devices on networks such as a cellular telephone networks and/or satellite networks.

Networks 109 may include networks of Internet devices, telephone networks, cellular telephone networks, fiber optic networks, local wireless networks (e.g., WiMAX), satellite networks, and any other desired network. The network 109 may include and/or function as a cloud computing infrastructure comprising various processing and/or memory devices (e.g., servers, databases, application providers, etc.). Network 109 may include a library manager 130, which may be a computing device as will be described later in further detail, configured to manage one or more libraries 135 that store content to be provided to users, such as at their homes 102. Libraries 135 may be storage devices, such as hardware and/or software servers, databases, etc. The content stored at the libraries 135 may be, for example, video on demand movies, streaming movies, television programs, songs, text listings, etc. The content stored at and/or provided by the master library 135 may include all content available to users at their homes 102. For example, if users have access to 150,000 titles (e.g., on demand movies and television shows), the 150,000 titles may be stored at and/or provided by the master library 135. In some aspects, the master library 135 might not store all of the content available to users and/or subscribers. Instead, the master library may be connected to one or more other content providers (not shown) in order to retrieve content requested by users. The content providers may be managed, owned, and/or operated by a service provider that manages, owns, and/or operates, for example, local office 103a or managed, owned, and/or operated by entities different from the service provider.

The network 109 may communicate with one or more gateways 125, which may be geographically distributed around the country or world. Gateway 125 may have one or more gateway servers 127 (e.g., a storage device) that stores and/or provides content requested by downstream devices, such as devices at home 102a and/or local offices 103a-n. The content servers 127 may store a subset of the content stored at master library 135. For example, if the master library stores and/or provides 150,000 titles, the gateway server 127 may store and/or provide 20,000 of those titles. Alternatively, some of the content stored at the gateway server 127 might not overlap with the content stored at the master library 135. For example, 17,600 of the titles at the gateway server 127 may correspond to titles stored at the master library 135. The remaining 2,600 might not be stored at the master library, and may be stored at and/or provided by an external content provider. Gateway 125 may be connected to a plurality of local offices 103a-n by one or more networks and/or communication links. Accordingly, content may be provided directly from gateway server 127 (instead of from, e.g., library 135) to any connected local office if the content is available at the gateway server.

As noted above, the local office 103a may include a variety of devices, such as a content on demand device 105, edge cache 106, and edge device manager 107 that may be configured to perform various functions. For example, content on demand device 105 may receive requests for on demand content from users at homes 102, through interface 104. As will be described in further detail in the examples below, the content on demand device 105 may process each received request and provide content and/or content recommendation lists in response to the requests. The content on demand device 105 may include software to validate user identities and entitlements, locate and retrieve requested data, encrypt the data, and/or initiate delivery (e.g., streaming, downloading) of the content to the requesting user and/or device. Content on demand device 105 may communicate with edge cache 106 and/or edge device manager 107 to provide the content or recommendation lists. For example, the content on demand device 105 may transmit commands to the edge device manager 107 to either provide or not to provide requested content and/or recommendation lists to the users, as will be described in further detail in the examples below. The edge cache 106 may be one or more computing devices that are configured to store content to be provided to users in the homes. The content stored at edge cache 106 may be a subset of the content stored at gateway server 127. For example, if the gateway server 127 stores and/or provides the 20,000 titles mentioned above, the edge cache 106 may store and/or provide 5,000 of those titles. Alternatively, some of the content stored at the edge cache 106 might not overlap with the content stored at gateway server 127. For example, 4,000 of the titles at the edge cache 106 may correspond to titles stored at the gateway server 127. The remaining 1,000 might not be stored at the gateway server, and may be stored at and/or provided by master library 135. The edge device manager 107 may query one or more databases, such as edge cache 106, gateway server 127, and/or master library 135 for content to be provided to users at their homes 102.

The local office 103 may also include one or more additional computing devices (e.g., servers). For example, local office 103 may include an application server that may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. These application servers may provide services in conjunction with content and/or recommendation lists provided to users.

Other local offices connected to gateway 125, such as local office 103n, may include the same or similar software and/or hardware devices as local office 103a (e.g., content on demand device, edge cache, edge device manager, application servers, interface devices, and the like). Local offices 103 may be edge devices because they provide content directly to requesting users and their homes 102, as opposed to gateways 125 which may provide content to homes through local offices 103 and networks 109 which may provide content to homes through local offices 103 and gateways 125. The content stored at each local office 103 (e.g., within an edge cache) may differ from the content stored at other local offices. In some aspects, the content stored (e.g., cached or otherwise temporarily stored) at each local office may dynamically vary based on the service area of the respective local office. The service area of the local office 103a may include homes 102 illustrated in FIG. 1. In some aspects, the service area may be defined by a physical content delivery network. For example, the homes 102 may be part of the service area of the local office 103a because they are physically and/or directly connected to the local office by one or more communication lines 101 (coaxial cables, optical fibers, wireless connections, etc.). A home 102 may be part of more than one service area. For example, if a home 102a is also physically and/or directly connected to the local office 103n, the home 102a may also be part of the service area of local office 103n. In some aspects, the demographics and/or interests in content within a service area may be similar. For example, a local office that serves a suburban area may serve primarily single-family homes and/or dwellings having families. A local office in an urban area, such as a large city, may serve primarily young adults that live in those areas. Because the demographics of each service area may be unique to that service area, content requested by users within each service area may be similar. Content requests by users in different service areas, on the other hand, may differ significantly. For example, suburban users may include children and/or parents interested in children's programs. Urban users, on the other hand, may be more interested in new and/or popular television shows than children's programs. As will be described in further detail in the examples below, content stored at a particular edge cache, such as edge cache 106, and/or content recommendations provided to users may be based on the service area and/or local office 103a that the user is part of and/or connected to.

An example home 102a may include an interface 120. The interface may comprise a device 110, such as a modem, which may include transmitters and receivers used to communicate on the links 101 and with the local office 103a. The device 110 may be, for example, a coaxial cable modem (for coaxial cable links 101), a fiber interface node (for fiber optic links 101), or any other desired modem device. The device 110 may be connected to, or be a part of, a gateway interface device 111. The gateway interface device 111 may be a computing device that communicates with the device 110 to allow one or more other devices in the home to communicate with the local office 103a and other devices beyond the local office. The gateway 111 may be a set-top box (STB), digital video recorder (DVR), computer server, or any other desired computing device. The gateway 111 may also include (not shown) local network interfaces to provide communication signals to devices 112a-n in the home, such as televisions, additional STBs, personal computers, laptop computers, wireless devices (wireless laptops and netbooks, mobile phones, mobile televisions, personal digital assistants (PDA), etc.), and any other desired devices. These devices (along with gateway 111 and/or modem 110) may be used to request content. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
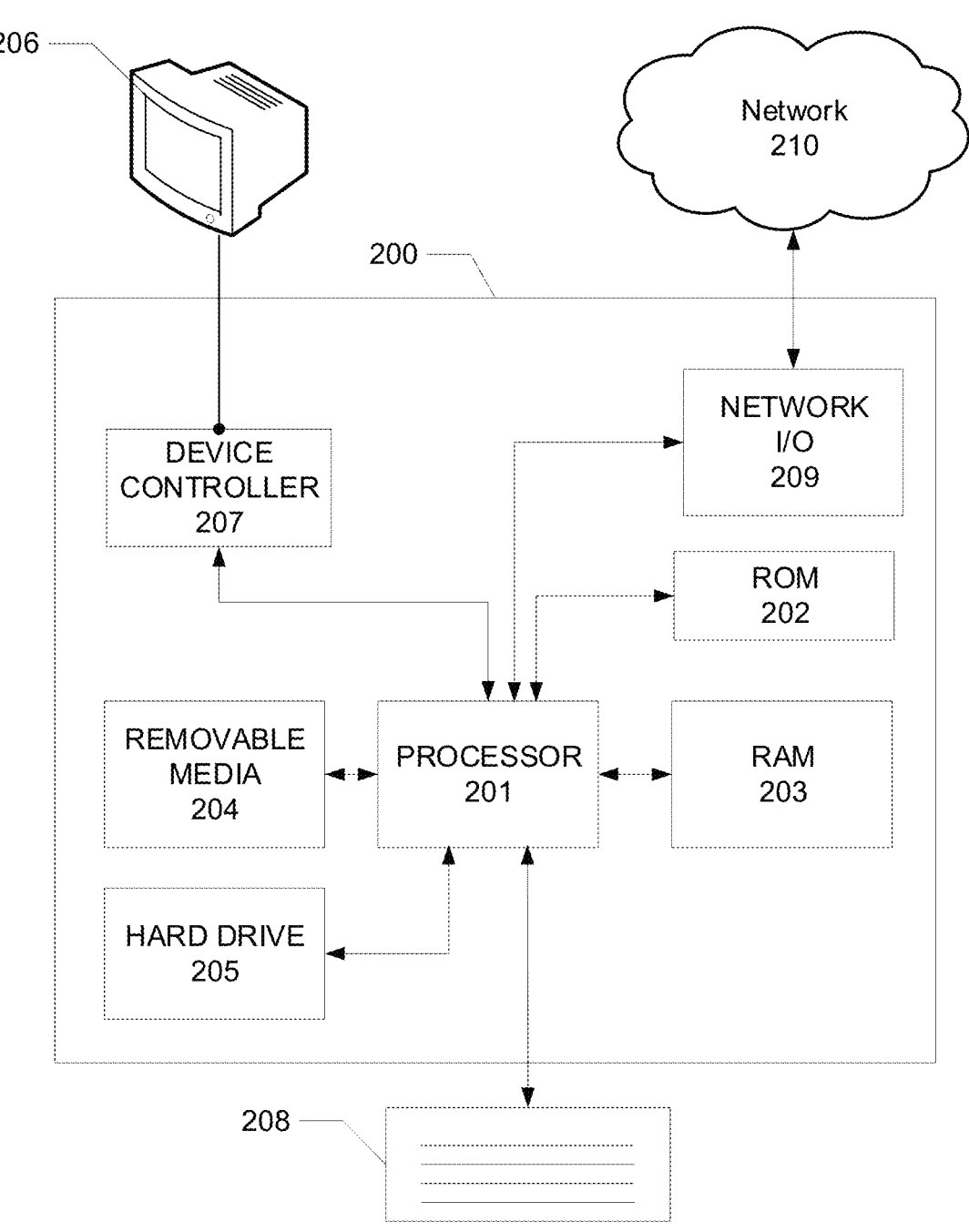
FIG. 2 illustrates an example computing platform on which various elements described herein can be implemented.

The various devices described herein may be computing devices, and FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

Figure 3:
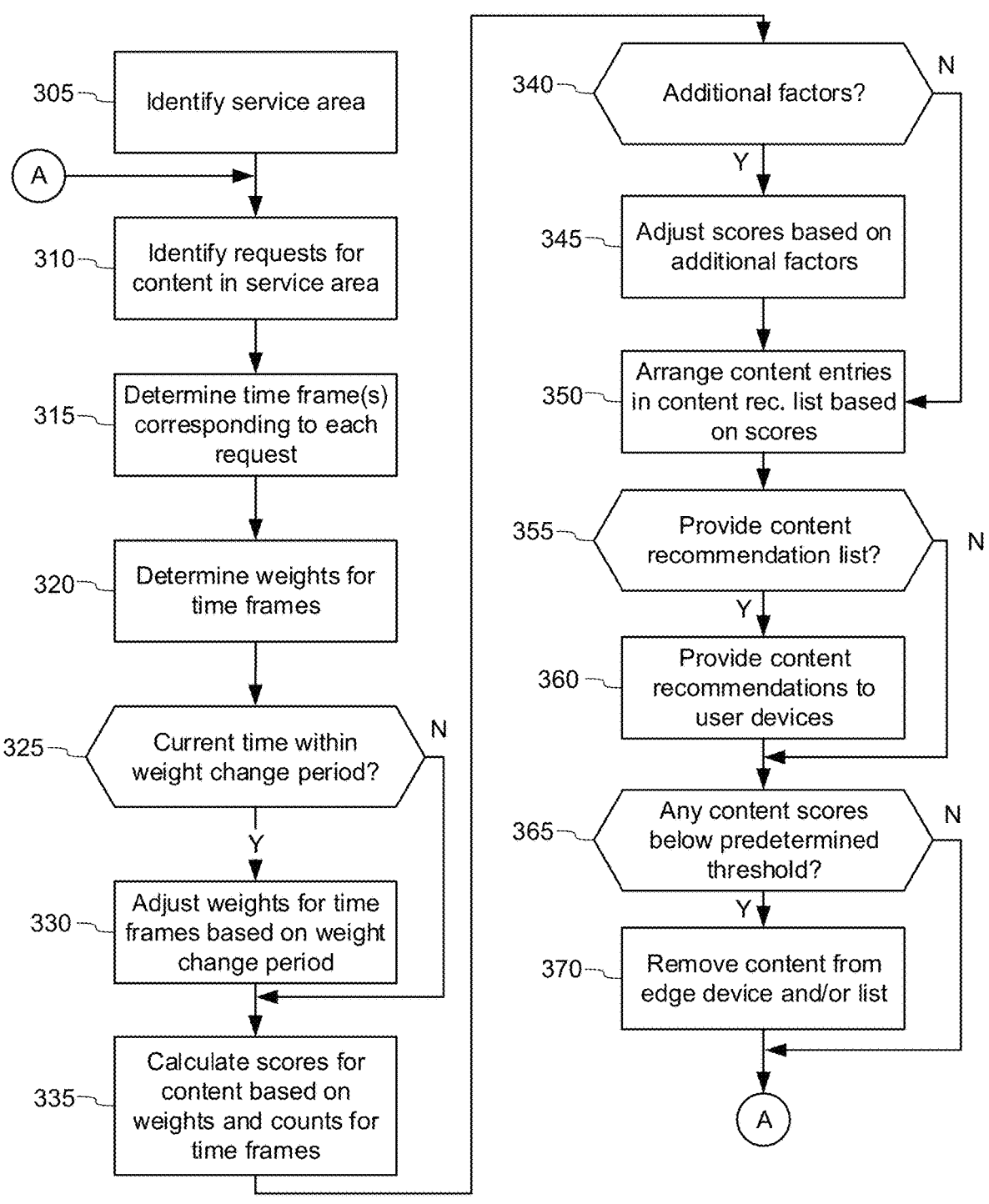
FIG. 3 illustrates an example method of providing content recommendations according to one or more illustrative aspects of the disclosure.

FIG. 3 illustrates an example method of providing content recommendations according to one or more illustrative aspects of the disclosure. The steps illustrated in FIG. 3 may be performed by a computing device at local office 103a, such as the content on demand device 105. The computing device may configure a content recommendation system for a particular service area. For example, the computing device may generate a content recommendation list (or retrieve the list from storage if one already exists). The content recommendation list may identify a plurality of content to recommend to users in the service area associated with local office 103a, and may rank the content according to how popular the content is with users in the common service area. As will be described in further detail in the examples below, the content recommendation list may be ordered based on a generated recommendation score, with a content item having the highest score at the top of the list, a content item having the second highest score at the second position on the list, etc. In some embodiments, the recommendation score for the listed content may also be based on a recency of requests for that content—for example, requests made within the last 15 minutes may be weighted more than requests made two hours ago. Such recency-based ranking can help provide the users with a more contextually and temporally appropriate ranking. The content recommendation list (or a portion thereof) may be provided to users in the service area of local office 103a in various formats, such as part of an electronic program guide, as an email message, or as any other display on a client device. For example, the computing device may recommend the top ten content items on the list to one or more users in the service area.

In step 305, the computing device may identify the users, homes, and/or client devices within the same geographic service area, to group them together for purposes of providing geographically-focused recommendation lists. The computing device may be provided with a list of users, homes, and/or client devices known to be in the same geographic service area. Alternatively, the computing device may transmit (e.g., broadcast) a message requesting users, homes, and/or client devices in the service area of the local office 103a, requesting the users, homes, and/or client devices to respond with unique identifiers to determine the makeup of the service area. In some aspects, interface devices at each home, such as interface 120, may respond to the request identifying the interface device (e.g., by providing a MAC address, IP address, and the like) and its geographic location and/or network connection. As previously discussed, the service area may include homes physically and/or directly connected to local office 103a. In some embodiments, the service areas may be established based on the physical network topology. For example, multiple homes that receive feeds from the same splitter may be grouped together as a service area. Also, when QAM channel service groups are used (e.g., DOCSIS service groups with bonded channels), the various devices assigned to a particular service group may be treated as being in a common service area.

In step 310, the computing device may begin to accumulate and process and/or analyze requests to generate recommendation lists. The computing device may identify (and/or otherwise capture) one or more content requests made within the service area identified in step 305. Capturing data (such as the content requests) may include monitoring, collecting, storing, etc. the data. The data may be optionally stored, temporarily buffered, or used in real-time. For example, the computing device may retrieve, from a database, identifiers for content (e.g., title, such as "Prometheus," program identifier, and the like) requested within a predetermined time period (e.g., within the last three hours). Alternatively, step 310 may be triggered as part of servicing each request as it is received, and may also be triggered periodically to update the recommendation lists due to the passage of time (e.g., as new requests become old requests).

In step 315, the computing device may identify and/or determine one or more time frames used to track the number of requests for each content item identified in step 310. The computing device may track the number of requests for each item within each time frame. The time frames may be mutually exclusive. For example, a first time frame may include a time period from 2 PM to 3 PM, and a second time frame may include a time period from 3 PM to 4:30 PM. The time frames may also overlap. For example, a first time frame may include a time period from 2 PM to 4 PM, and a second time frame may include a time period from 3:30 PM to 4:15 PM. The time frames may also be dynamic. For example, a first time frame may include a time period from the current time (e.g., the time of a content request) to fifteen minutes prior to the current time. The first time frame may change as the current time changes. A second time frame may similarly include a time period from the current time to one hour ago. Any number of time frames may be identified and/or stored by the computing device.

During configuration, the computing device may also generate and/or retrieve count tables and counts for one or more items of content. The count tables may track the number of requests (counts) for particular content items made within each time frame determined in step 315. For example, if the first time frame includes a time period from the current time to fifteen minutes in the past, and an item of content, such as Movie 1, has been requested eight times within the first time frame, the count stored in the count table for Movie 1 during the first time frame may be eight.

Figure 6:
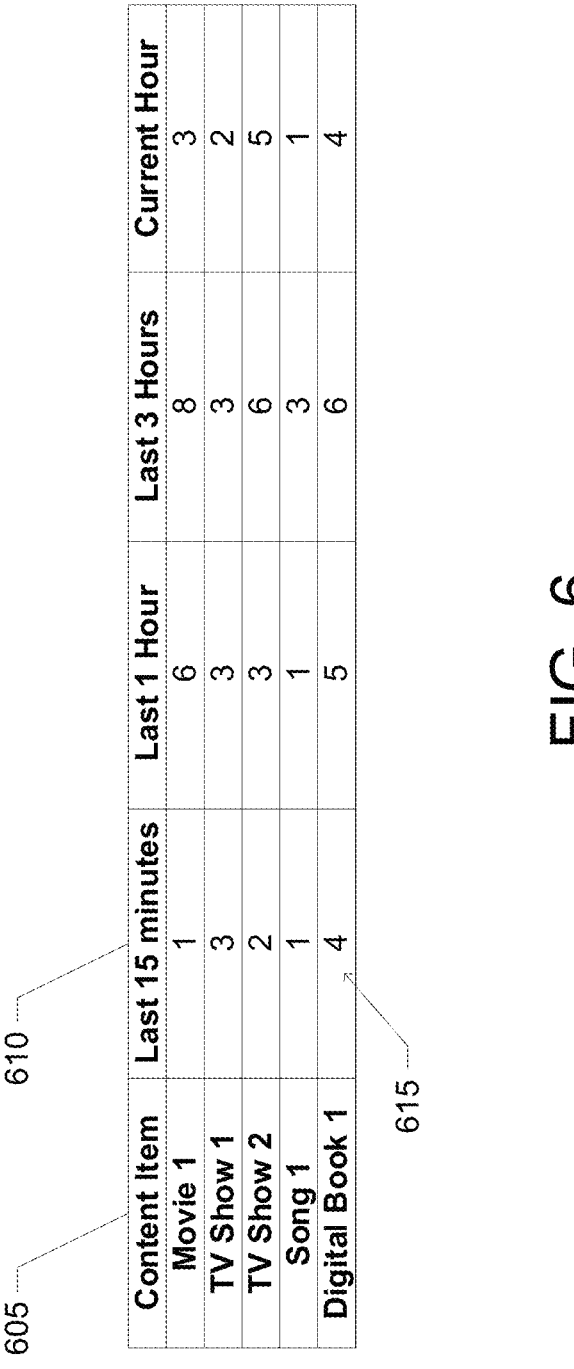
FIG. 6 illustrates an example of data maintained by a computing device according to one or more illustrative aspects of the disclosure.

FIG. 6 illustrates an example data collection of counts 600 (e.g., in table form) maintained by a computing device, such as content on demand device 105, according to one or more illustrative aspects of the disclosure. The count table may include a list of content items 605, such as Movie 1, TV Show 1, TV Show 1, Song 1, and Digital Book 1. The list 605 may include all content items stored in edge cache 106, gateway server 127, and/or master library 135. Alternatively, the list 605 might include only content items stored at edge cache 106. The count table may also include one or more time periods, such as the Last 15 minutes 610, Last 1 Hour, Last 3 Hours, and Current Hour. For each content item, the computing device may track the number of times the content item has been requested within each time frame. For example, element 615 indicates that Digital Book 1 has been requested 4 times within the last 15 minutes.

The number of requests for a content item within a particular service area may indicate the popularity of the content item. As will be described in further detail in the examples below, the more popular a content item in the service area, the more likely the content item will be recommended to other users in the service area and/or that the content item will be moved to edge cache 106. A popularity score may be generated for each content item. The score may depend on the number of requests for the content item within various time frames. In some aspects, the more recent the requests, the more "popular" the content item may be. The number of counts in each time frame may be weighted differently in calculating the popularity score for a particular item of content.

Returning to FIG. 3, in step 320, the computing device (e.g., the content on demand device 105) may begin a series of steps to determine, e.g., arrange or rearrange, how content will be ranked or appear in recommendation lists provided to users in a service area. In step 320, the computing device may determine the weights for each time frame, representing how the system should emphasize time periods in generating a score for each content item. The score calculated for each content item may depend on the number of requests each content item has received, and the time frame in which those requests were received. In the example count table of FIG. 6, the number of requests in the time frame of the last 15 minutes may be given a weight of 40%. The number of requests in the time frame of the last 1 hour may be given a weight of 20%. The number of requests in the time frame of the last 3 hours may be given a weight of 15%. In this example, more recent requests (e.g., within the last 15 minutes) may be given more weight than less recent requests (e.g., within the last 1 hour or 3 hours), in the relative proportions of their weights. Other caches may prioritize content differently (e.g., a cache may give 90% weight to the last 15 minutes, to help keep up with fast changes in demand by ensuring that most of the most recently-requested content will be locally cached, but this may come at the expense of having to relocate content more frequently). Additional time frames may be factored into the popularity score. For example, the number of requests in the time frame of the current hour may be given a weight of 25%. Based on these example weights, Movie 1 may have a popularity score of 3.55 ($1\times0.40+6\times0.20+8\times0.15+3\times0.25$). TV Show 1 may have a popularity score of 2.75 ($3\times0.40+3\times0.20+3\times0.15+2\times0.25$).

As noted above, requests may be weighted based on how recently they were made. This may generally allow the recommendation list to be temporally accurate, so that the list can present the most recent data on popularity. This recency, however, can be even further enhanced if the system can take into account predictable changes in request types. For example, it may generally be expected that when school children arrive home from school, there will be an influx of children requesting to see children's programming, and fewer requests for daytime television such as soap operas. However, if school lets out at 3:30, and a recommendation list is requested at 3:35, then most of the requests made in the last 15 minutes or last 2 hours will still be the daytime programming or soap operas, and a basic recency recommendation list might not be of value yet since the request at 3:35 is more likely to be coming from a child. To help stay up-to-the-minute for these predictable changes in behavior, the computing device herein may be configured to be more sensitive to recent requests (e.g., to weight them more) if the requests are made during certain periods of the day when requests are expected to change. So, for example, if a switch from "daytime soaps" programming to "children's programming" is expected to occur between 3 and 4 pm, then during that "weight change" period, requests may carry greater weight, so that the recommendation list can more quickly reflect a temporally-appropriate list of recommended programs.

In step 325, the computing device may determine whether the current time is within a predetermined weight change period. The current time may also include the time (or period of time) that the computing device will provide content recommendation lists to users. Content consumption may change quickly in response to shifts in the demographics of the consumers. For example, on demand day time television shows, such as soap operas, may be the most popular type of content from 10 AM to 1 PM in a particular service area because stay-at-home adults might watch television at this time. At 1 PM, the most popular type of content may switch from soap operas to children's programs or cartoons because preschoolers or kindergarteners may return home from school at this time. At 4 PM, the most popular type of content may switch from children's programs to music television shows or reality shows when highschoolers return from school. In this example, one weight change period may be a predetermined time frame that includes 1 PM, such as 12:30 PM to 1:30 PM, when viewership demographics change from stay-at-home adults to preschoolers. Another weight change period may be a predetermined time frame that includes 4 PM, such as 3:40 PM to 4:15 PM, when viewership demographics change from preschoolers to highschoolers. Other weight change periods may occur between a weekday (Friday) and a weekend day (Saturday) and vice versa (between Sunday and Monday) and before and after a holiday (e.g., the hours following up to Christmas and the hours during the day after Christmas). These periods may indicate a shift in the demographics of content users. The weight change periods may be predefined or dynamically determined.

If the current time is within a weight change period (step 325: Y), the computing device may adjust the weights determined in step 320. During weight change periods, the number of requests for particular content may shift rapidly. For example, from 12:30 PM to 1:30 PM, the ratio of requests for children's television shows to soap operas might increase (e.g., fewer and fewer requests for soap operas, more and more requests for children's shows, and/or a combination thereof). Because changes in requests may occur rapidly during these weight change periods, the computing device may give more weight to more recent time frames and accordingly, less weight to less recent time frames. For example, assuming that counts in the time frame of the last 15 minutes are currently weighted 60% and counts in the time frame of the last 3 hours are currently weighted 40%, the computing device may increase the weight for the time frame of the last 15 minutes to 80% and decrease the weight for the time frame of the last 3 hours to 20% in step 330.

In step 335, the computing device may calculate the popularity score (e.g., a number, factor, characteristic, symbol, etc.) of each content item to be included on a content recommendation list based on the weights and number of counts for the content item in each time frame. As previously described, the computing device may calculate that Movie 1 (the requested content item) has a popularity score of 3.55 ($1 \times 0.40 + 6 \times 0.20 + 8 \times 0.15 + 3 \times 0.25$). If the weights for one or more time frames were adjusted in step 460, the computing device may re-calculate scores for other content items on the recommendation list. For example, the computing device may calculate that TV Show 1 has a popularity score of 2.75 ($3 \times 0.40 + 3 \times 0.20 + 3 \times 0.15 + 2 \times 0.25$) based on the new weights. Instead of (or in addition to) numerical scores, such as 3.55 and 2.75, the calculated popularity score may comprise non-numerical scores and/or a combination of numerical and non-numerical scores. For example, the popularity score may be a number, a factor, a characteristic, a symbol, etc.

In step 340, the computing device may determine whether additional factors for calculating the popularity score exist. An additional factor may include the storage location of items of content listed in the recommendation list. For example, content items may be stored at edge cache 106, gateway server 127, master library 135, and/or any other content provider. In order to encourage users in the service area to request content items stored at edge cache 106 (instead of gateway server 127 and/or master library 135), the computing device may increase the scores of content items currently at edge cache 106. The computing device may similarly encourage users in the service area to request content items stored at gateway server 127 over content items stored at master library 135 and/or an external content provider.

Accordingly, in step 345, the computing device may adjust the popularity score for content items based on the additional factors (e.g., the storage location of content items). The device may prioritize content based on where the content is stored, or how difficult it would be to retrieve if it were requested. For example, more weight may be given to content items stored at edge cache 106 than content items stored at gateway server 127 and content stored at master library 135. More weight might also be given to content items stored at gateway server 127 than content items stored at master library 135. For example, the score calculated in step 335 for a content item may be incremented by 1 point if the content item is stored at edge cache 106. The score might not be incremented or decremented if the content item is stored at gateway server 127. The score may be decremented by 1 point if the content item is stored at master library 135. Any means readily available to one of ordinary skill in the art to increase the score for content stored at edge cache 106 and to decrease the score for content stored elsewhere (e.g., at master library 135) may be used.

Adjustments made to popularity scores based on the storage location of content items may also be based on the amount of congestion in backend networks used to deliver the content items. If the amount of congestion on the network used to deliver content from the master library 135 to the gateway server 127 exceeds a predetermined threshold, the computing device may further decrease popularity scores for content stored at the master library 135. For example, instead of decrementing the popularity score of a content item A stored at master library 135 by 2, the computing device may decrement the score by 3 during times of high congestion in the network between the master library 135 and the gateway server 127. The computing device may decrement the popularity score for content item A even further if the network used to deliver content item A from the gateway server 127 to the edge cache 106 is also congested. For example, the computing device may decrement the score for content item A by 5 (instead of 3) during times of high congestion in both networks. Popularity scores for content items stored at the gateway server 127 and/or edge cache 106 may be similarly adjusted based on the amount of network congestion.

The computing device may also adjust the popularity score for content items based on the size of each content item. The computing device may prioritize a content item having a smaller size over a content item having a larger size. For example, the score for a 10 megabyte content item A may be increased relative to the score for a 30 megabyte content item B if both content items A and B are stored at the same location (e.g., edge cache, gateway server, and/or master library). In some aspects, content items A and B may be the same content item, but at different resolutions and/or frame rates. For example, content item A may be a standard definition version of an episode of Law & Order, whereas content item B may be the high definition version. By encouraging users (via recommendations) to access smaller content items relative to other content items, the amount of bandwidth used to transmit content items to users may be reduced.

In some aspects, the computing device may recommend content stored at edge cache 106, but not content stored in gateway 127 and/or master library 135. In these aspects, the computing device might not consider the storage location of recommended content items.

In step 350, the computing device may place identifiers for each content item in the content recommendation list based on the score calculated for the content item. For example, if a calculated score is greater than scores for any other content items identified by the content recommendation list, the identifier for the requested content item may be placed at the beginning of the list. The computing device may order the content entries in the content recommendation list based on calculated scores for each content item in the list. For example, the content item with the highest score may be placed first on the list; the content item with the second highest score may be placed second on the list, etc.

In step 355, the computing device may determine whether to provide the content recommendation list to a user (or users) in the service area. For example, users may indicate interest in receiving the content recommendation list by indicating so in their profiles and/or inputting such a request on their device(s). The electronic program guide (or other client device interface) may include a button that initiates this request. For example, the button may be a 'Most interesting choices' button. If the recommendation list is to be provided to users (step 355: Y), the computing device may provide the content recommendation list to one or more client devices (e.g., user devices and/or devices at home 102) in step 360. Portions of the content recommendation list may also be provided. For example, a predetermined number of recommendations may be provided (e.g., the top ten content items on the recommendation list). Additional portions of the recommendation list may be provided if users request more recommendations (e.g., content items eleven through twenty on the recommendation list).

In step 365, the computing device may determine whether the score for any of the content items falls below a predetermined threshold score in step 365. If so (step 365: Y), the computing device may remove the content item from the edge cache 106 if the content item is stored in edge cache 106 in step 370. For example, the threshold may be a score of 2. If the score for TV Show 1 is 1.5, the computing device may remove TV Show 1 from the edge cache 106. Alternatively, the threshold may be position 453 of the content recommendation list. If TV Show 1 is at position 473, the computing device may remove TV Show 1 from the edge cache 106 (assuming TV Show 1 is stored at edge cache 106). The computing device may also remove TV Show 1 from the recommendation list. Content may be efficiently stored by removing unpopular content (e.g., content with few and/or distant requests) from the edge cache 106. The computing device may return to step 310 to re-compute scores based on any additional requests recorded after the scores were calculated, any changes to time frame weights, etc. Alternatively, the computing device may return to step 305 if a change in the defined service area occurs (e.g., additions/removal of homes and/or devices).

Figure 4A:
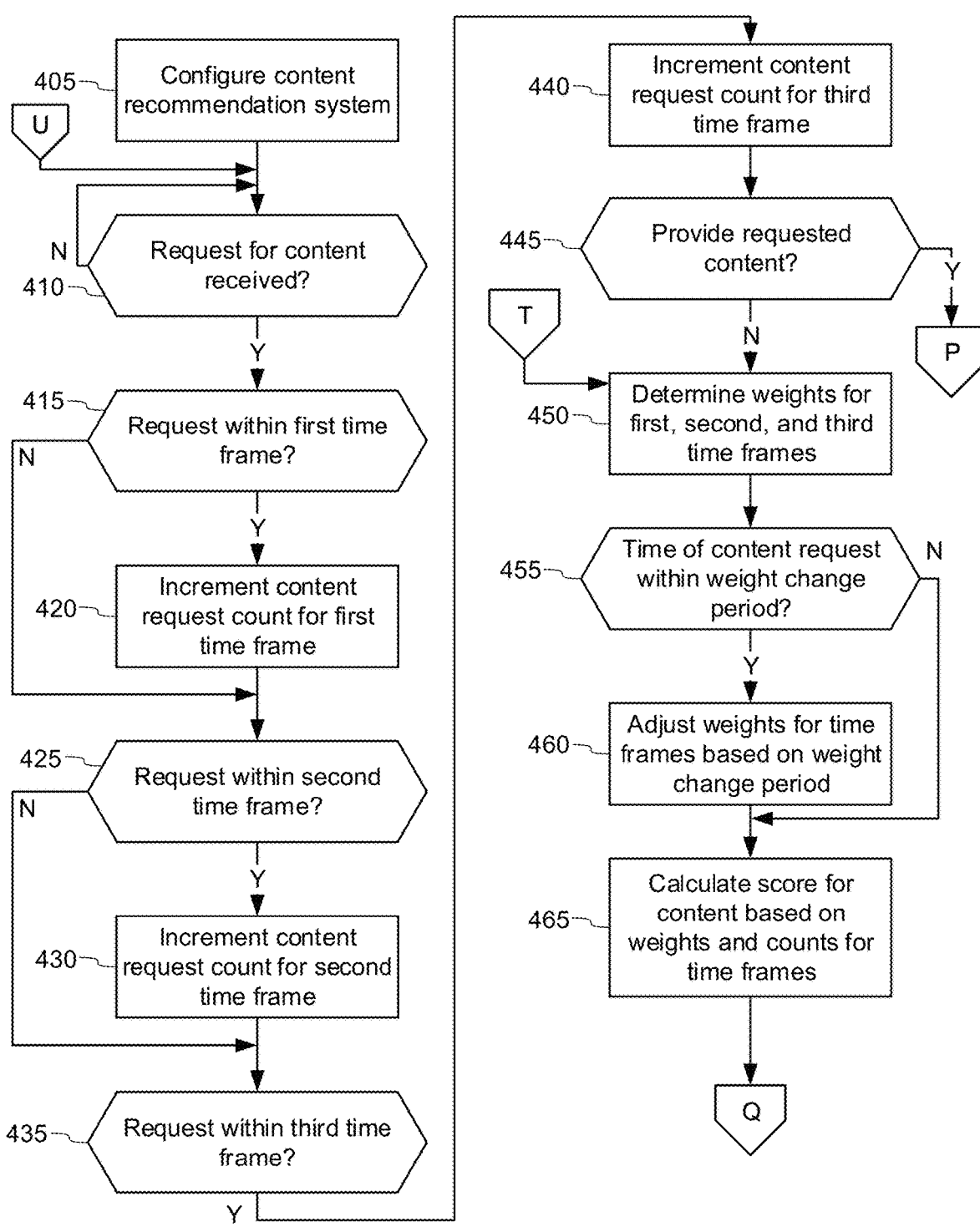
FIGS. 4A-B illustrate an example method of providing content recommendations according to one or more illustrative aspects of the disclosure.
Figure 4B:
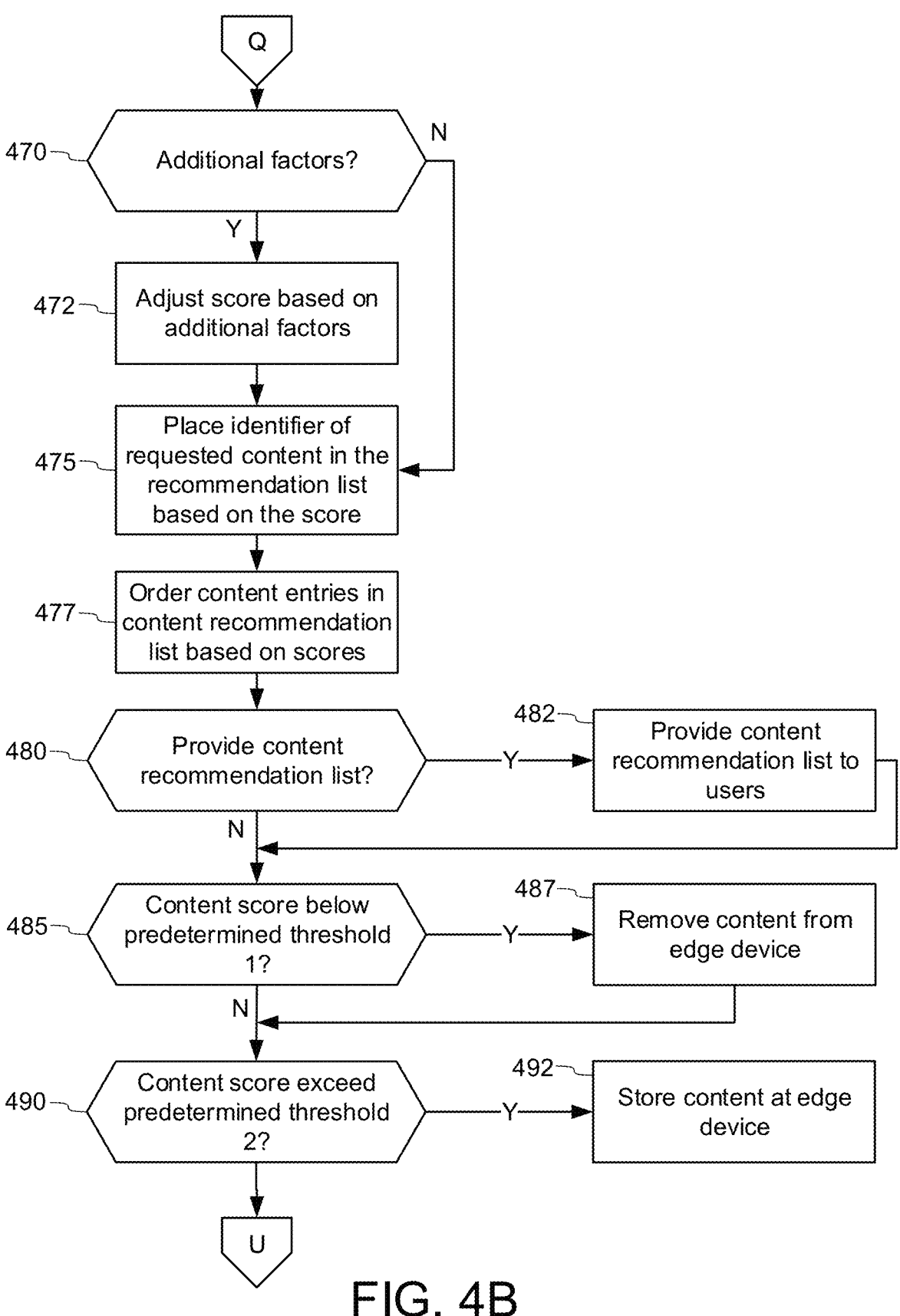

Content item scores may be updated each time a request for content and/or a request for the recommendation list is made. FIGS. 4A-B illustrate an example method of providing content recommendations according to one or more illustrative aspects of the disclosure. The steps illustrated in FIGS. 4A-B may be performed by a computing device at local office 103*a*, such as the edge cache 106 and/or edge device manager 107. For illustrative purposes, the steps will be described as being performed by manager 107.

In step 405, the computing device may configure the content recommendation system if it has not done so already. Configuration may include one or more of the actions taken in steps 305, 310, and 315 previously described. For example, the computing device may identify the appropriate service area, identify any requests for content received in the service area, and determine which time frame each request occurred in.

In step 410, the computing device may wait to receive a request for content, such as a request from a client device for on demand content. When a request for a content item is received (step 410: Y), the computing device may identify the content item in the count table 600, as previously described. If the content item is not identified in the count table (e.g., if the content item has not been requested within any of the time frames), the computing device may create an entry for the content item.

In step 415, the computing device may determine whether the request for the content item is within the first time frame (e.g., within the last 15 minutes). If the request is within the first time frame (step 415: Y), the computing device may increment the content request count for the first time frame in step 420. For example, the count for Movie 1 in the last 15 minutes (illustrated in FIG. 6) may be incremented from 1 to 2 in step 420. In step 425, the computing device may determine whether the request for the content item is within the second time frame (e.g., within the last hour). If the request is within the second time frame (step 425: Y), the computing device may increment the content request count for the second time frame in step 430. In step 435, the computing device may determine whether the request for the content item is within the third time frame (e.g., within the last 3 hours). If the request is within the third time frame (step 435: Y), the computing device may increment the content request count for the third time frame in step 440. The computing device may perform these steps for any number of time frames (such as four time frames, as illustrated in FIG. 6).

The algorithm may be simplified. For example, if a first time frame in the count table is contained wholly within a second time frame, the computing device may automatically increment the count for the second time frame in response to determining that the content item request occurred in the first time frame. For example, if the computing device determines that a request occurred in the last 15 minutes (step 415: Y), the computing device may automatically increment the counts for the second and third time periods (within the last hour and within the last three hours, respectively).

In step 445, the computing device may determine whether to provide the requested content to the user. For example, a user might not be entitled to receive requested content because of age restrictions, failure to supply a required password for accessing the content, a delinquent account, etc. Another reason for denial of a request may be due to bandwidth or resource limitations that would prevent suitable delivery of the requested content. For example, such a determination may be based on the storage location of the requested content. The content may be stored at edge cache 106, gateway server 127, and/or master library 135. The closer the content is to the requesting user (e.g., physical distance and/or distance based on the number of hops to transmit content to the user), the more readily the content might be provided to the user. For example, if the content is stored at edge cache 106, the computing device may determine that the content should be provided to the user in step 445. On the other hand, if the content is stored at gateway server 127 and/or master library 135, the content might not be provided to the user because providing the content would require additional backend network bandwidth (e.g., allocation of bandwidth for providing the requested content from the master library 135 to the gateway 125 and/or from the gateway 125 to local office 103*a*).

In some aspects, the computing device may determine that the content should be provided to the user if the content is available from any storage location, including at edge cache 106, gateway server 127, master library 135, and/or any other content provider. If the computing device determines to provide the content to the user, the computing device (e.g., the content on demand device 105) may transmit a command to edge device manager 107 and/or edge cache 106 (which also may be computing devices) to transmit the content to the requesting user.

Figure 5:
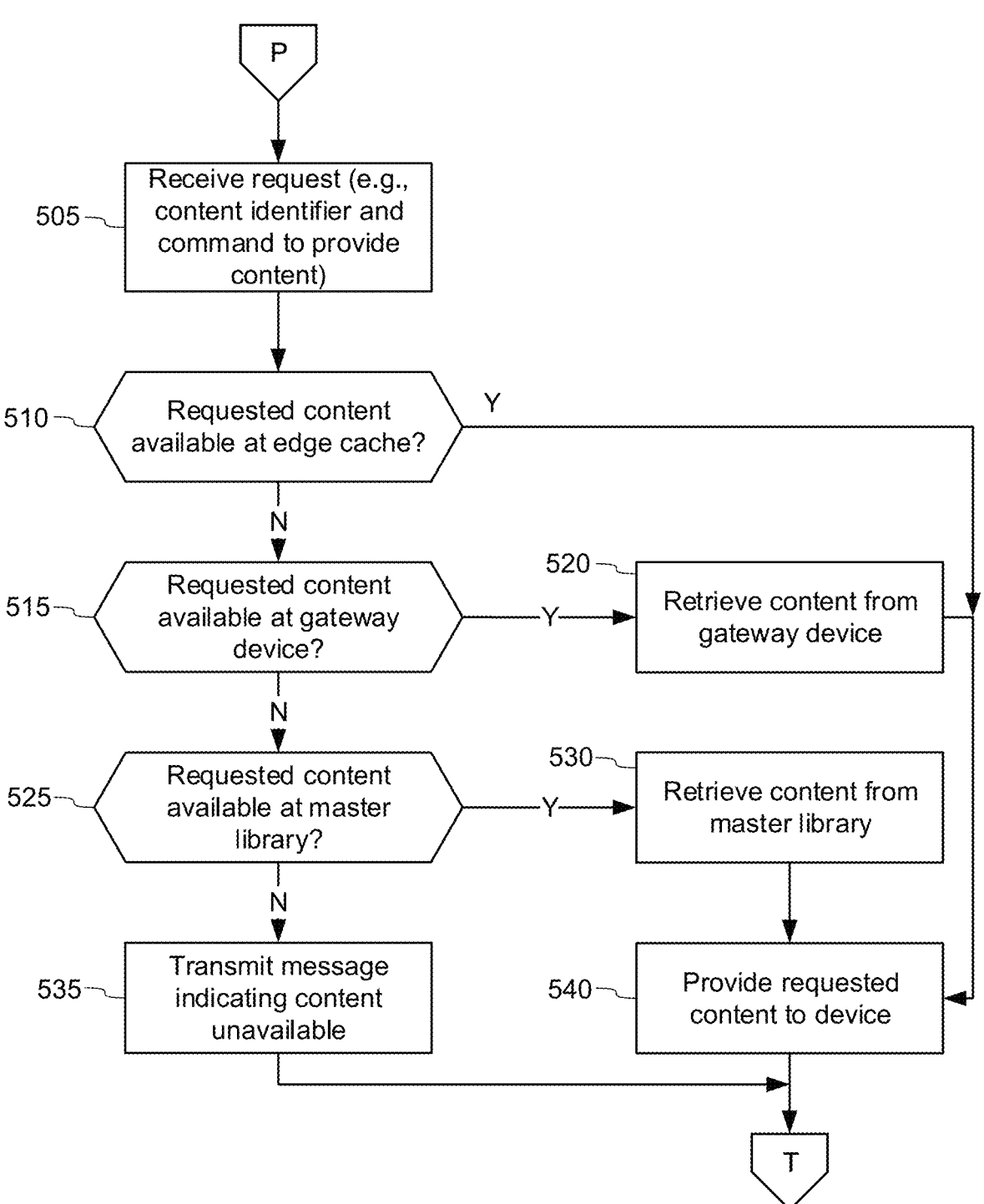
FIG. 5 illustrates an example method of providing content according to one or more illustrative aspects of the disclosure.

FIG. 5 illustrates an example method of providing content according to one or more illustrative aspects of the disclosure. The steps illustrated in FIG. 5 may be performed by a computing device at local office 103*a*, such as the edge cache 106 and/or edge device manager 107. For illustrative purposes, the steps will be described as being performed by manager 107. In step 505, the manager may receive the command to provide content to the requesting user from the content on demand device 105. The command may identify the content to be provided (e.g., a title, program identifier, or other unique identifier) and/or the location of the content. Each unique location may be identified by a unique identifier, such as Edge1 for edge cache 106, Gateway1 for Gateway Server 127, MasterLib1 for Master Library 135. If a location is not provided by the device 105, the manager 107 may perform additional steps to locate the content.

In step 510, the manager may determine whether the requested content is at the edge cache 106. If so (step 510: Y), the manager may provide the content directly from the local office 103*a* (e.g., from edge cache 106) in step 540. In step 515, the manager may determine whether the requested content is at the gateway server 127. If so (step 515: Y), the manager may retrieve the content from the gateway server 127 in step 520 and provide the content to the user in step 540. In step 525, the manager may determine whether the requested content is at the master library 135. If so (step 525: Y), the manager may retrieve the content from the master library 135 in step 530 and provide the content to the user in step 540. The manager 107 may perform similar checks for any additional storage locations. If the content is unavailable, the manager 107 may transmit a message to the user indicating that the content is unavailable in step 535.

Returning to FIG. 4A, in step 450, the computing device (e.g., the content on demand device 105) may begin a series of steps to rearrange how content will appear in recommendation lists provided to users. These steps may substantially correspond to steps 320-350 previously described. In step 450, the computing device may determine weights for the first, second, and third time frames (or however many time frames are used to calculate content recommendation scores). Step 450 may substantially correspond to step 320.

In step 455, the computing device may determine whether the time of the content request (in step 410) occurs during a weight change period (e.g., a period of time when content consumption patterns change rapidly due to changes in demographics of viewers/audience in the service area). Step 455 may substantially correspond to step 325.

In step 460, if the user's content request occurred during a weight change period (step 455: Y), the computing device may adjust the weights determined in step 450. Step 460 may substantially correspond to step 330. In step 465, the computing device may calculate the popularity score of the requested content item or other content items to be included on the recommendation list based on weights and number of counts for the content item in each time frame. Step 465 may substantially correspond to step 335.

With reference to FIG. 4B, in step 470, the computing device may determine whether to consider additional factors to calculate popularity scores for the requested content item or other content items on the recommendation list. Step 470 may substantially correspond to step 340. As previously discussed, an additional factor may include where the requested content item is stored (e.g., edge cache 106, gateway server 127, master library 135, etc.). The computing device may increase the score for content stored at edge cache 106 and/or decrease the score for content stored at master library 135. In step 472, the computing device may adjust the scores based on the additional factors identified in step 470. Step 472 may substantially correspond to step 345.

In step 475, the computing device may place an identifier of the content requested by the user in the content recommendation list based on the calculated score. In step 477, the computing device may order the content entries in the content recommendation list based on the scores (e.g., highest score first, lowest score last). Steps 475 and 477 may substantially correspond to step 350.

In step 480, the computing device may determine whether to provide the content recommendation list to the requesting user and/or other users in the service area. If so, the list may be provided in step 482. Various instances of providing the list were described in step 360. The recommendation list may also be provided with the content provided to the user (e.g., both the content and recommendation list may be provided to the user in step 540).

In step 485, the computing device may determine whether any of the scores for content items on the recommendation list falls below a predetermined threshold. Step 485 may correspond to step 365. In step 487, if the content item falls below the threshold (step 485: Y), the computing device may remove (or cause removal of) the content item from the edge cache 106 (if the content item is stored in the edge cache). Step 487 may correspond to step 370. In some aspects, the score for the content requested in step 410 may fall below the threshold. This may be the case if, for example, no other requests for the content item were made in any of the tracked time frames. Nevertheless, the requested content item might not be removed from the edge cache 106 if the edge cache serves the content item to the user or otherwise wishes to maintain the content in the edge cache.

In step 490, the computing device may determine whether scores for any content items exceeds a second predetermined threshold. If so (step 490: Y), the computing device may request that the content item be stored at the edge cache 106 in step 492. For example, the threshold may be a score of 4. If the score for Movie 1 is 5.2, and movie 1 is not stored at edge cache 106, the computing device may request Movie 1 from the gateway server 127, master library 135, and/or any other storage location (e.g., at a storage location in local office 103*n*, from a content provider, etc.) and store Movie 1 at the edge cache 106. The predetermined threshold may also be a certain point in the content recommendation list. For example, the predetermined threshold may be position 41 on the ordered content recommendation list. If Movie 1's score places Movie 1 at position 32, the computing device may request that Movie 1 be stored at edge cache 106. The computing device may make the same request for any other content items within the first 40 positions on the recommendation list.

By caching high-scoring content items at edge cache 106, users in the same service area may be encouraged (by recommendations) to consume content items stored at edge cache 106 instead of at gateway server 127 and/or master library 135, saving transmission bandwidth in the backend networks, such as a content delivery network. Furthermore, the recommendations may be accurate and/or otherwise catered to users in the service area because users in the same service area tend to have similar interests (e.g., viewers in rural areas vs. viewers in urban areas, viewers in the Midwest United States vs. viewers in the Eastern United States, etc.). Steps 490 and 492 might not be performed if the computing device only computes popularity scores for content stored at the edge cache 106 because recommended content items might only include content stored at the edge cache 106.

The various features described above are merely non-limiting examples, and can be rearranged, combined, subdivided, omitted, and/or altered in any desired manner. For example, features of the computing device described herein (which may be one the devices illustrated in FIG. 1) can be subdivided among multiple processors and computing devices. The true scope of this patent should only be defined by the claims that follow.

The invention claimed is:

1. A method comprising:
   determining, by one or more computing devices, a weight change period that surrounds a time boundary between:
      a first time period during which a first type of content is popular; and
      a second time period during which a second type of content is popular;
   sending, by the one or more computing devices and to a user device located at a service area, a content recommendation list comprising a plurality of content items that are ranked based on:
      weighting a first plurality of requests received from the service area during the weight change period differently from a second plurality of requests received from the service area outside the weight change period; and
      storage locations of the plurality of content items within a content delivery network;
   receiving, from the user device, an indication of a selected content item from the content recommendation list;
   selecting, based on the storage locations of the plurality of content items within the content delivery network, an edge server associated with the service area; and
   causing the selected edge server to send, to the user device, the selected content item,
   wherein a first content item, in the content recommendation list and stored in the edge server, is ranked higher than a second content item in the content recommendation list and stored in a different server in the content delivery network.

2. The method of claim 1, wherein the first time period and the second time period are consecutive periods of time.

3. The method of claim 1, wherein the selected content item is of the second type of content;
   wherein the content recommendation list is sent to the user device during the weight change period; and
   wherein the first plurality of requests are weighted higher than the second plurality of requests.

4. The method of claim 1, wherein the selected content item is of the second type of content;
   wherein other content items in the content recommendation list are of the first type of content; and
   wherein the selected content item is ranked higher in the content recommendation list than the other content items.

5. The method of claim 1, wherein the first type of content comprises a first genre of content, and wherein the second type of content comprises a second genre of content.

6. The method of claim 1, further comprising:
   causing, by the one or more computing devices and based on the first plurality of requests and the second plurality of requests, the selected content item to be moved to the edge server.

7. The method of claim 1, wherein the time boundary corresponds to an expected change in demographics of viewers between the first time period and the second time period.

8. The method of claim 1, wherein the weight change period comprises equal amounts of time before the time boundary and after the time boundary.

9. An apparatus comprising:
   one or more processors; and
   memory storing instructions that, when executed by the one or more processors, cause the apparatus to:
      determine a weight change period that surrounds a time boundary between:
         a first time period during which a first type of content is popular; and
         a second time period during which a second type of content is popular;
      send, to a user device located at a service area, a content recommendation list comprising a plurality of content items that are ranked based on:
         weighing a first plurality of requests received from the service area during the weight change period differently from a second plurality of requests received from the service area for the content item outside the weight change period; and
         storage locations of the plurality of content items within a content delivery network;
      receive, from the user device, an indication of a selected content item from the content recommendation list;
      select, based on the storage locations of the plurality of content items within the content delivery network, an edge server associated with the service area; and
      cause the selected edge server to send, to the user device, the selected content item, wherein a first content item, in the content recommendation list and stored in the edge server, is ranked higher than a second content item in the content recommendation list and stored in a different server in the content delivery network.

10. The apparatus of claim 9, wherein the first time period and the second time period are consecutive periods of time.

11. The apparatus of claim 9, wherein the selected content item is of the second type of content;
   wherein the content recommendation list is sent to the user device during the weight change period; and
   wherein the first plurality of requests are weighted higher than the second plurality of requests.

12. The apparatus of claim 9, wherein the selected content item is of the second type of content;
   wherein other content items in the content recommendation list are of the first type of content; and wherein the selected content item is ranked higher in the content recommendation list than the other content items.

13. The apparatus of claim 9, wherein the first type of content comprises a first genre of content, and wherein the second type of content comprises a second genre of content.

14. The apparatus of claim 9, wherein the instructions, when executed by the one or more processors, cause the apparatus to:

move, based on the first plurality of requests and the second plurality of requests, the selected content item to the edge server.

15. The apparatus of claim 9, wherein the time boundary corresponds to an expected change in demographics of viewers between the first time period and the second time period.

16. The apparatus of claim 9, wherein the weight change period comprises equal amounts of time before the time boundary and after the time boundary.

17. A non-transitory computer-readable medium storing instructions that, when executed, cause:

determining a weight change period that surrounds a time boundary between:

a first time period during which a first type of content is popular; and a second time period during which a second type of content is popular;

sending, to a user device located at a service area, a content recommendation list comprising a plurality of content items that are ranked based on:

weighting a first plurality of requests received from the service area during the weight change period differently from a second plurality of requests received from the service area outside the weight change period; and storage locations of the plurality of content items within a content delivery network;

receiving, from the user device, an indication of a selected content item from the content recommendation list;

selecting, based on the storage locations of the plurality of content items within the content delivery network, an edge server associated with the service area; and causing the selected edge server to send, to the user device, the selected content item, wherein a first content item, in the content recommendation list and stored in the edge server, is ranked higher than a second content item in the content recommendation list and stored in a different server in the content delivery network.

18. The non-transitory computer-readable medium of claim 17, wherein the first time period and the second time period are consecutive periods of time.

19. The non-transitory computer-readable medium of claim 17, wherein the selected content item is of the second type of content;

wherein the content recommendation list is sent to the user device during the weight change period; and wherein the first plurality of requests are weighted higher than the second plurality of requests.

20. The non-transitory computer-readable medium of claim 17, wherein the selected content item is of the second type of content;

wherein other content items in the content recommendation list are of the first type of content; and wherein the selected content item is ranked higher in the content recommendation list than the other content items.

21. The non-transitory computer-readable medium of claim 17, wherein the first type of content comprises a first genre of content, and wherein the second type of content comprises a second genre of content.

22. The non-transitory computer-readable medium of claim 17, wherein the instructions, when executed, further cause:

moving, based on the first plurality of requests and the second plurality of requests, the selected content item to the edge server.

23. The non-transitory computer-readable medium of claim 17, wherein the time boundary corresponds to an expected change in demographics of viewers between the first time period and the second time period.

24. The non-transitory computer-readable medium of claim 17, wherein the weight change period comprises equal amounts of time before the time boundary and after the time boundary.

25. A system comprising:

an apparatus and a user device, wherein the user device is located at a service area, wherein the apparatus comprises:

one or more processors; and memory storing instructions that, when executed by the one or more processors, cause the apparatus to:

determine a weight change period that surrounds a time boundary between:

a first time period during which a first type of content is popular, and a second time period during which a second type of content is popular;

send, to the user device located at the service area, a content recommendation list comprising a plurality of content items that are ranked based on:

weighing a first plurality of requests received from the service area during the weight change period differently from a second plurality of requests received from the service area for the content item outside the weight change period; and storage locations of the plurality of content items within a content delivery network;

receive, from the user device, an indication of a selected content item from the content recommendation list;

select, based on the storage locations of the plurality of content items within the content delivery network, an edge server associated with the service area; and cause the selected edge server to send, to the user device, the selected content item, wherein a first content item, in the content recommendation list and stored in the edge server, is ranked higher than a second content item in the content recommendation list and stored in a different server in the content delivery network; and wherein the user device is configured to output the first content item.

26. The system of claim 25, wherein the first time period and the second time period are consecutive periods of time.

27. The system of claim 25, wherein the selected content item is of the second type of content;

wherein the content recommendation list is sent to the user device during the weight change period; and wherein the first plurality of requests are weighted higher than the second plurality of requests.

28. The system of claim 25, wherein the selected content item is of the second type of content;

wherein other content items in the content recommendation list are of the first type of content; and wherein the selected content item is ranked higher in the content recommendation list than the other content items.

29. The system of claim 25, wherein the first type of content comprises a first genre of content, and wherein the second type of content comprises a second genre of content.

30. The system of claim 25, wherein the instructions, when executed by the one or more processors, cause the apparatus to:

move, based on the first plurality of requests and the second plurality of requests, the selected content item to the edge server.

31. The system of claim 25, wherein the time boundary corresponds to an expected change in demographics of viewers between the first time period and the second time period.

32. The system of claim 25, wherein the weight change period comprises equal amounts of time before the time boundary and after the time boundary.

\* \* \* \* \*